Feb. 20, 1940. E. E. HANSON 2,191,381
SAFETY SIGNAL OPERATOR
Filed April 7, 1939
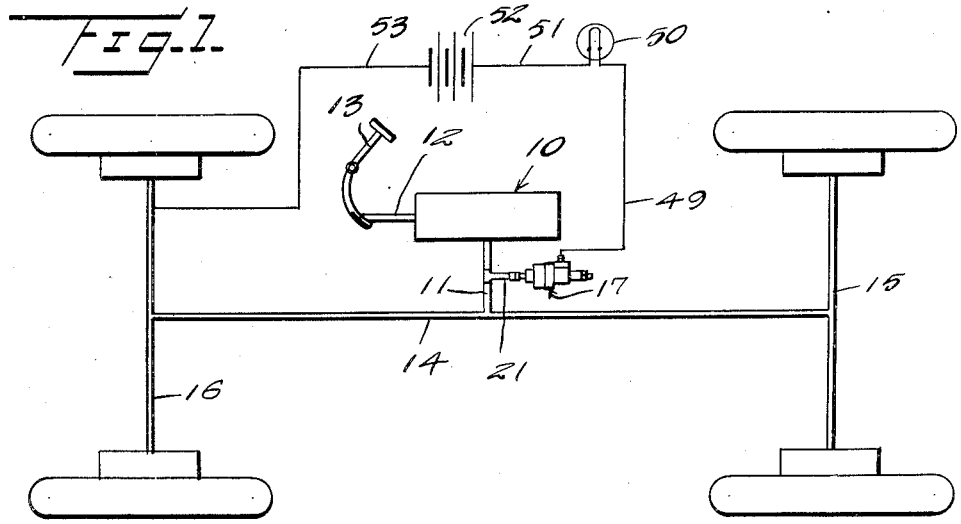
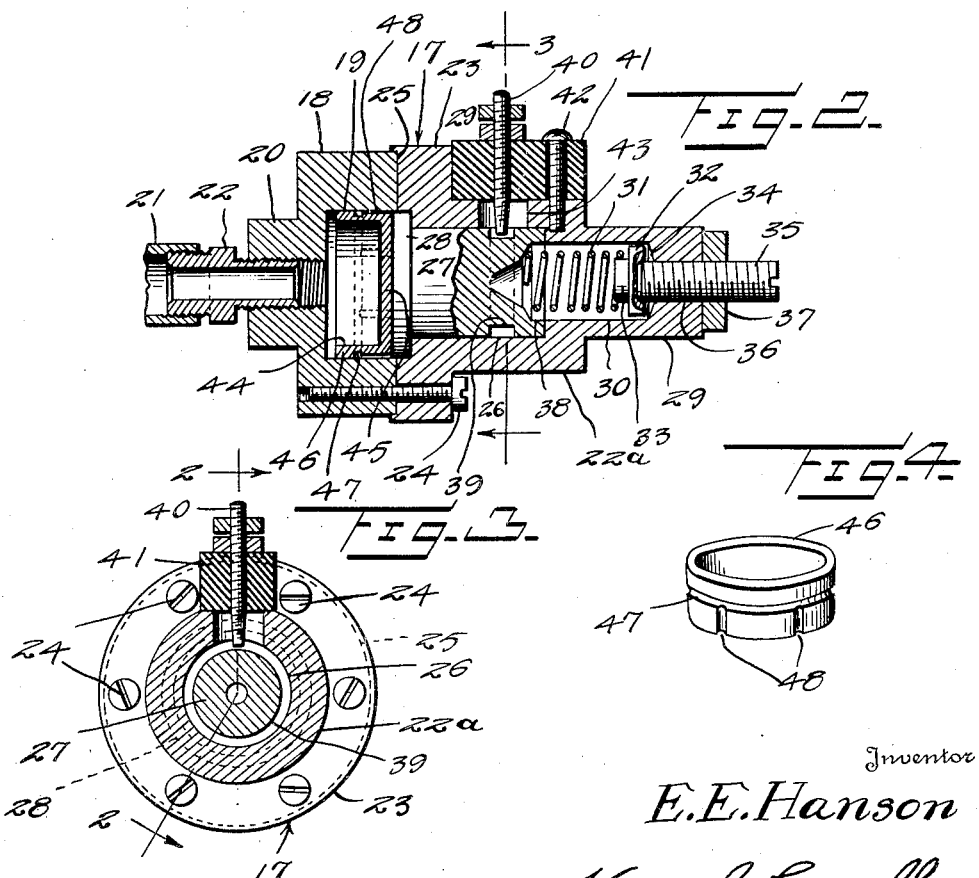
Inventor
E. E. Hanson
By Kimmel & Crowell
Attorneys Patented Feb. 20, 1940

2,191,381

UNITED STATES PATENT OFFICE 2,191,381

SAFETY SIGNAL OPERATOR

Ernest E. Hanson, Ladysmith, Wis.

Application April 7, 1939, Serial No. 266,615

2 Claims. (Cl. 200—82)

This invention relates to signal operators and more particularly to a circuit closing device connected to a hydraulic brake system for actuating a signal upon reduction of pressure in the system through breakage or leakage in the fluid system.

An object of this invention is to provide a safety device in the form of a pressure operated circuit closing member which under normal pressure in the fluid system of a hydraulic brake system is adapted to be maintained in a circuit opening position but which upon reduction of pressure in the system below normal pressure through leakage in the system is adapted to be moved to a circuit closing position for operating a remotely disposed signal.

A further object of this invention is to provide an automatic circuit closing means which is adapted to be interposed in a hydraulic brake system which may be readily adjusted to effect closing of the signal circuit at a predetermined reduction of pressure in the hydraulic brake system.

To the foregoing objects and to others which may hereinafter appear, the invention consists of the novel construction, combination and arrangement of parts as will be more specifically referred to and illustrated in the accompanying drawing, wherein an embodiment of the invention is shown, but it is to be understood that changes, variations and modifications may be resorted to which fall within the scope of the invention as claimed.

In the drawing:

Figure 1 is a diagrammatic view of a hydraulic brake system having a circuit closing means constructed according to an embodiment of this invention connected thereto, Figure 2 is a sectional view taken on the line 2—2 of Figure 3, Figure 3 is a sectional view taken on the line 3—3 of Figure 2, and Figure 4 is a perspective view of the flexible diaphragm used with the signal operator.

Referring to the drawing, the numeral 10 designates generally a pressure member which is connected to a pipe 11 and which is operated by means of a connecting rod 12. The connecting rod 12 is connected to a pedal or rockable operator 13 so that rocking of the operator 13 will effect movement of the piston rod 12 and thereby force liquid from the pump or pressure member 10 into the pipe line 11. The pipe line 11 is connected to a longitudinally extending pipe line 14 which is connected to a transverse line 15 at one end of the vehicle and is also connected to a second transverse pipe line 16 at the opposite end of the vehicle. The pipe lines 15 and 16 are adapted to be connected to brake operators (not shown) and which are of conventional construction.

In order to provide a means whereby the operator of the vehicle may readily determine when a break has occurred in the pipe lines 11, 14, 15 or 16, I have provided a signal operating member 10 comprising a housing generally designated as 17. The housing 17 comprises a cup-shaped member 18 having a cylindrical bore 19 and a threaded reduced bore 20 communicating with the bore 19. The bore 20 is adapted to be connected by means of a pipe 21 and a connector 22 to the hydraulic system between the pressure member 10 and the brake operators and in the present instance, the pipe 21 is connected to the pipe 11.

A cylinder 22a provided with a flange 23 is secured to the head or cup-shaped member 18 by means of bolts 24 and in the present instance, the flange 23 has a seat 25 within which the cap or head member 18 engages. In this manner the head or cap 18 is adapted to be maintained in axial relation to the cylinder 22a. The cylinder 22a is provided with a bore 26 within which a piston 27 is slidable. The piston 27 at the inner end thereof is provided with a flange 28 which is engageable in an annular seat 29 provided in the inner end of the cylinder 22a. The flange 28 acts as a means to limit the movement of the piston 27 inwardly of the cylinder or bore 26.

The cylinder 22a is provided with a reduced extension 29 having a bore 30 which communicates at its inner end with the cylinder or bore 26. A spring 31 is loosely mounted in the bore 30 and at its outer end engages against a plate 32 having a stud 33 integral therewith and about which the outer end of the spring engages so as to hold the spring 31 centrally of the bore 30. The plate 32 is provided with a tapered recess 34 on the outer face thereof within which the inner end of a threaded adjusting member 35 is adapted to engage. The adjusting member 35 is threaded through an opening 36 in the extension 29 and is locked in adjusted position by a lock nut 37.

The piston 27 at its outer end is provided with a recess 38 within which the inner end of the spring 31 engages. The piston 27 is also provided at a point between the ends thereof with an annular groove or channel 39 and a contact member 40 is threaded through an insulating block or body 41 which is fastened to the housing 17 by means of a bolt or screw 42. The cylinder 22a is provided with a relatively large opening 43 through which the terminal or contact member 40 loosely engages so that the inner end of the contact or terminal member 40 will be insulated from the housing or cylinder 22a. The inner end of the contact member 40 loosely engages in the groove 39 and when the piston 27 is at the end of its outward movement with the pressure normal in the fluid system, the inner end of the contact or terminal 40 will be spaced from the adjacent side walls of the groove 39. However, when a leakage occurs in the hydraulic braking system, the spring 31 which is tensioned by the tensionable screw 35 will move the piston 27 inwardly until the outer wall of the groove 39 contacts with the pin or terminal member 40.

A flexible diaphragm in the form of a yieldable cup 44 is positioned in the bore 19 and the diaphragm member 44 is adapted to be flexed by pressure of the fluid from the pipe line 21 so as to normally hold the piston 27 in a circuit opening position. The head 45 of the diaphragm 44 is adapted to engage against the head or flange 28 of the piston 27 and the diaphragm or piston operator 44 is provided with an annular flange 46 engaging in the bore 19. The flange 46 is provided with an annular groove 47 between the ends thereof and also with longitudinally extending grooves 48 communicating with the groove 47 and with the forward face of the head 45 so that in the event any liquid leaks past the diaphragm 44 this liquid may be forced rearwardly through the grooves 48 and the groove 47.

The terminal or contact member 40 is adapted to be connected by means of a conductor 49 to one side of a signal 50 which may be a visible signal in the form of a light bulb or may be an audible signal such as a buzzer or bell. The other side of the signal 50 is connected by a conductor 51 to one side of a battery or source of current supply 52. The opposite side of the battery or current supply 52 is grounded to the hydraulic system by means of a conductor 53 which is connected to the frame of the machine or to one of the pipes forming the hydraulic brake system. In the present instance, the conductor 53 is connected to the pipe 16.

In the use and operation of this safety signal operator, the housing 17 is adapted to be connected between the pressure member and the brake operators by means of the pipe 21. The terminal 40 is connected to a signal 50 by a conductor 49 and under normal pressure in the hydraulic system the pressure of the liquid will expand the diaphragm 45 so as to maintain the piston 27 in its outermost position against the tension of the spring 31. In this position the inner end of the terminal 40 will be positioned intermediate the side walls of the groove 39 and also the bottom wall of the groove 39 so that the electric circuit comprising the pipe lines and the conductors 49, 51 and 53 will be open. However, in the event the pressure in the braking system between the pressure member 10 and the brake operators drops below a predetermined normal pressure, the spring 31 will move the piston 27 inwardly until the inner end of the terminal 40 contacts with the outer wall of the groove 39.

In this position the circuit to the signal member 50 will be closed so that the operator of the vehicle will be able to readily determine that a leakage or abnormal reduction of pressure in the braking system has occurred. The adjustment of the screw 35 will regulate the tension on the spring 31 so as to thereby effect an inward movement of the piston 27 at a predetermined reduction in pressure within the hydraulic braking system.

A signal operator constructed according to this invention can be readily interposed in a conventional hydraulic braking system without changing the present parts of the braking system, it only being necessary to connect the housing or signal operating member 17 to a selected point within the braking system. The particular point of the position of the signal operator 17 may be at any convenient point within the system wherein the pressure of the liquid is affected by the operation of the pressure member 10.

What I claim is:

1. In a hydraulic braking system, a safety signal operating means comprising a housing adapted to be connected to the braking system, a piston slidable in said housing, a diaphragm in said housing confronting one end of said piston and adapted to be flexed by pressure in said system, tensionable means in said housing engaging the opposite end of said piston, said piston having an annular groove therein and said housing having an opening confronting said groove, a terminal loosely engaging through said opening and projecting into said groove and normally spaced from the walls of said groove, insulated means fixed to said housing supporting said terminal relative to said housing, said housing having an annular seat therein adjacent said one end of said piston, and an annular flange carried by said one end of said piston engageable with said seat to thereby limit the movement on one direction of said piston under inward flexing of said diaphragm.

2. In a hydraulic braking system, a safety signal operating means comprising a housing adapted to be connected to the braking system, a piston slidable in said housing, a diaphragm in said housing confronting one end of said piston and adapted to be flexed inwardly against said piston to thereby move said piston in one direction by pressure of liquid in said system, a spring in said housing engaging the opposite end of said piston and normally urging said piston in the opposite direction, threaded tensionable means for said spring, said piston having an annular groove between the ends thereof, said housing having an opening confronting said groove, a terminal extending loosely through said opening and loosely engaging in said groove, an insulated member fixed to said housing and supporting said terminal, said housing having an annular seat therein adjacent said one end of said piston, and an annular flange carried by said piston engageable on said seat to thereby limit the movement of said piston in said one direction by said diaphragm, the tension of said spring being such that upon reduction of liquid pressure against said diaphragm said spring will move said piston in the opposite direction to thereby effect contact of said terminal with a wall of said groove and thereby effect a closing of an electrical circuit.

ERNEST E. HANSON.